Nov. 28, 1939.　　　W. H. GREENLEAF　　　2,181,272
WEIGHING SCALE
Filed Oct. 23, 1937
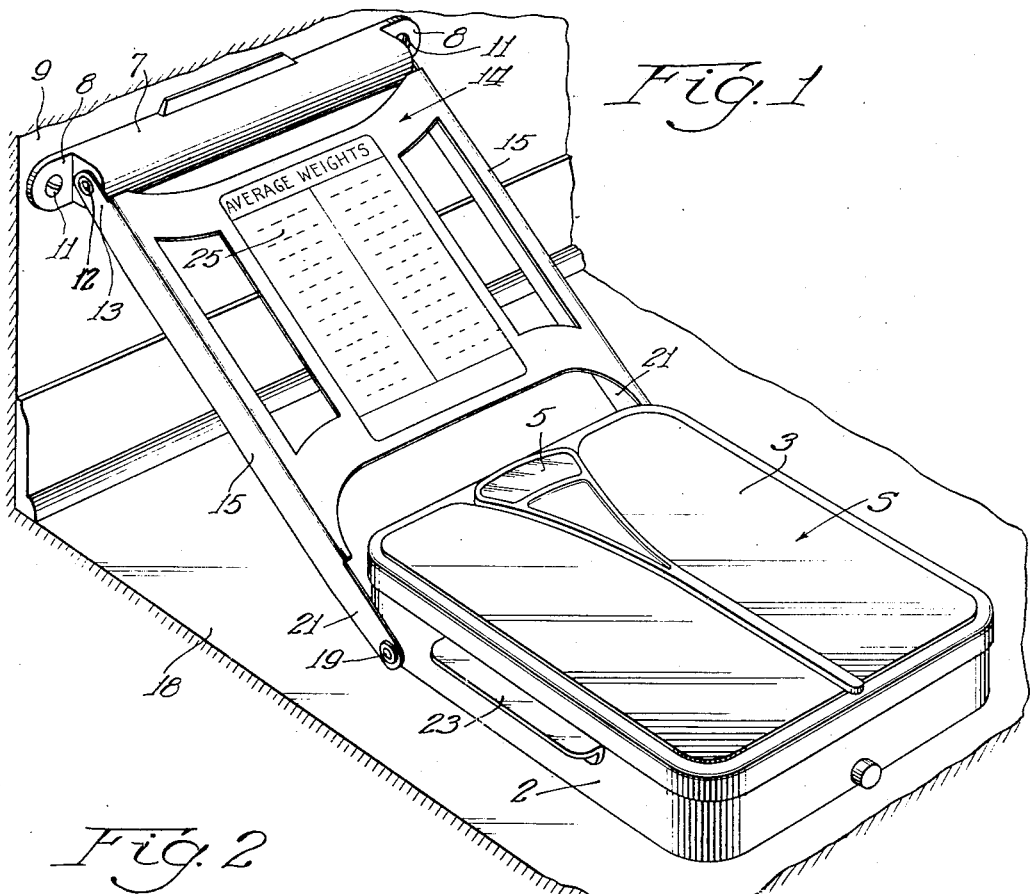
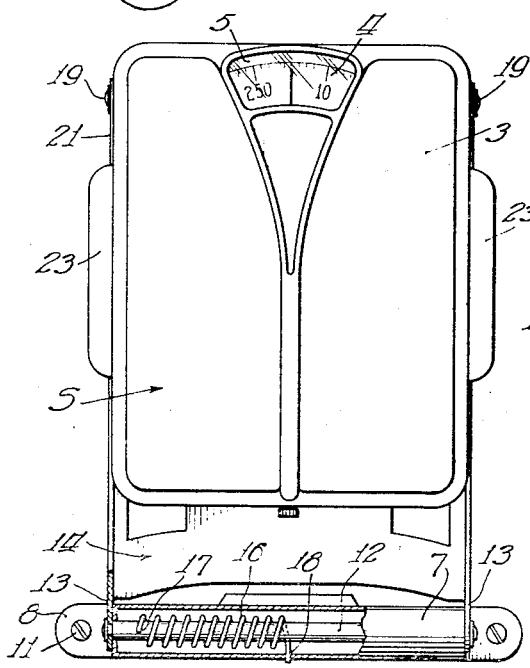
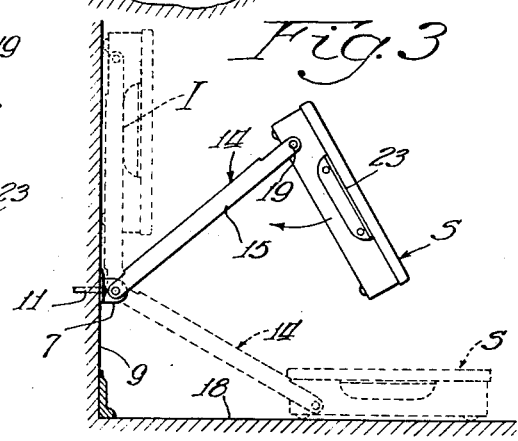
Inventor:
William H. Greenleaf
By: Zabel, Carlson, Ditzbaugh
and Wells
Atty.

Patented Nov. 28, 1939

2,181,272

UNITED STATES PATENT OFFICE 2,181,272

WEIGHING SCALE

William H. Greenleaf, Chicago, Ill.

Application October 23, 1937, Serial No. 170,591

4 Claims. (Cl. 265—27)

My invention relates to improvements in weighing scales, and more particularly to semi-permanent mounting means for such scales whereby to maintain the scales at will in operative or inoperative position.

Weighing scales of the type employed for postage for office purposes, or employed for determining personal weight, such as bathroom scales, have heretofore been of the portable type intended to rest upon a table, or in the case of a personal scale, upon the floor during use. The practice with such scales is to leave them upon the table or floor, as the case may be, when not in use. Among the disadvantages encountered in connection with the use of such portable scales, and because the mechanism contained therein is of a comparatively delicate nature, is damage to the parts thereof by contact with other articles, loss or theft of the scales where used in public places, the usurping often of valuable space required for other purposes when such scales are not in actual use, and in general such disadvantages as are usually attendant in connection with the use of portable devices intended for actual useful function during only short periods of the day.

It is an object of my invention, therefore, to provide an improved weighing scale having a novel and convenient mounting means so arranged as to permit of the semi-permanent mounting of the scale upon a wall or other vertical surface of the room in which it is to be used, whereby the scale may be maintained at will in an operative position upon a horizontal supporting surface, or in an inoperative position above such surface and against the vertical wall surface referred to.

Another object is to provide a weighing scale of the character described incorporating in its mounting means mechanism yieldingly to retain the scale in either its operative or inoperative position.

A further object is to provide a weighing scale, as described, including in its mounting means a sizeable chart containing information pertinent to the user which is rendered visible when the scale is in its operative position, but which is completely concealed when the scale is in its inoperative position.

A further object is to provide a weighing scale, as described, which when mounted upon a door, such for example a closet door, serves automatically, when moved to its operative position upon the adjacent floor surface, as a door stop, thus to prevent movement of the door with its attached scale during use.

Other objects, the advantages and uses of the invention will become apparent after reading the following specification and claims, and after consideration of the drawing forming a part of this specification, wherein:

Fig. 1 is a perspective view of my improved weighing scale and mounting means in a position for operation;

Fig. 2 is a front plan view of the mechanism shown in Fig. 1 in its inoperative position; and Fig. 3 is a side elevation of the mechanism shown in Fig. 1 illustrating the movement of the parts from one scale position to another.

With reference to the drawing, I have selected for illustration herein a weighing scale and mounting means of the type such as adapted for personal use in bathrooms, bedrooms and the like. The scale mechanism S may be of the type illustrated and described in my United States Letters Patent No. 2,047,681 and Des. 98,804, and comprises in general a metal casing 2 having a platform 3 upon which a person wishing to be weighed may stand, and a movable scale dial 4 visible through a window 5 for indicating the weight in pounds of the person standing upon the platform 3. Such a scale is that typifying the portable so-called "bathroom scale".

My improved mounting means may comprise, as shown, a bracket 7 in the form of a hollow casing having ears 8 at opposite ends thereof by means of which the bracket may be fixed to a vertical wall surface 9 by screws 11. Referring to Fig. 2, a shaft 12 extends longitudinally through the interior of the casing 7, and has fixed at its opposite ends the arms 13 of a connecting link 14. I prefer to form the link 14 of sheet steel with perpendicularly turned flanges 15, one end of which comprises the arms 13. A torsion spring 16 encompassing the rod 12, may be fixed at one end 17 to the rod, and the other end at 18 to a wall of the casing 7.

In adjusting the spring 16, I prefer to place it under torque sufficient to maintain the link 14 in an elevated position bearing the weight of the scale S, as indicated in Fig. 2, but to yield under manual force and under the weight of the scale S, and to permit the scale to rest flatly upon the adjacent floor surface 18 when in the position shown in Fig. 1, this latter function because of the effect of the scale mass through the increased leverage of the link 14 as it is swung about its fulcrum point upon the bracket 7. The scale S may be pivotally secured to the outer end of the connecting link 14 by pivot pins 19 secured to opposite sides of the scale S, and to the adjacent arm portions 21 of the link flanges 15. In order that the scale may set parallel to the wall surface 9 when in its inoperative or elevated position, as indicated in Fig. 2, I prefer to affix to opposite side walls of the scale, flange members 23 which are adapted to engage with the adjacent edges of the link flanges 15 when the scale is moved to its inoperative position, as shown at I in dotted lines in Fig. 3.

With the scale in its operative position, as indicated in Fig. 1, and the connecting link 14 of the mounting means extending between the bracket and the adjacent end of the scale, I have employed the generally upwardly facing surface of the bracket 14 to support thereon a chart, such as indicated at 25, containing information pertinent to the person using the scale, such as an average weight chart where the scale is to be used for personal weight. This chart is of course entirely out of sight when the scale is moved to its inoperative position, as indicated in Fig. 2. A person desiring to use the scale has merely to draw downwardly upon the body of the scale S (see Fig. 2), thereby to overcome the resistance of the spring 16 and to lower the scale from the upper dotted line position shown in Fig. 3 to the lower dotted line position shown therein, whereupon the scale mechanism may rest flatly upon the adjacent floor, and will retain that position, since the weight of the scale acting upon the lever arm provided by the link 14, is sufficient entirely to overcome the force of the torsion spring 16. Where the mounting means is fastened upon a closet door, for example, the scale when moved to its operative position, serves automatically to hold the door as a friction stop, and when moved to its inoperative position, the door may be closed with the scale entirely out of view.

In ordinary installations, I contemplate that the scale shall be moved upwardly against the wall surface of the room in which it is used, whether over a desk or over the floor, but in all events, it will be in a position clear of the supporting surface upon which it is to be used, so that no damage is likely to occur to the delicate mechanism thereof, nor will it impair normal usage of the horizontal supporting surface.

Where my invention is applied to scales used in public places, such as hotel rooms or in places of business open to the public, there is little likelihood of loss or theft of the scale, since it is at all times attached to a permanent wall of the room in which it is to be used, and becomes virtually a fixture subject of course to removal to another location by detaching the bracket 7 from the wall.

I claim:

1. In combination, a weighing scale adapted to rest upon a substantially horizontal surface during use, a bracket adapted to be fixed upon a substantially vertical surface, a link member pivoted at one end portion relative to said bracket and pivotally connected at its other end portion to one end portion of said scale, and yielding means tending to swing said link member upwardly to a position parallel with said vertical surface.

2. In combination, a weighing scale having a casing, a link pivoted at one end to one end portion of said scale casing, said link being of a length sufficient to extend beyond the opposite end portion of said casing when the casing is pivoted to a position overlapping and substantially parallel with said link, a bracket adapted to be fixed upon a substantially vertical wall surface, and means pivotally connecting the opposite end of said link to said bracket.

3. A weighing scale and mounting therefor comprising in combination, weighing mechanism of the character intended to lie flat upon a horizontal supporting surface during use and having its operating parts enclosed within a rigid casing, a bracket intended to be fixed upon a vertical surface at a point spaced slightly above said horizontal surface, a plate member of a length greater than the length of said casing pivotally mounted at one end upon said bracket whereby said plate may be swung upwardly against said vertical surface, and means pivotally connecting the outer end of said plate member to one end of said scale casing whereby when said plate is swung downwardly the scale may rest upon said horizontal surface in operative position and when swung upwardly the scale may be suspended vertically parallel with said vertical surface in inoperative position, said plate having a relatively large area thereof exposed to view when said scale is in its operative position and said area being entirely concealed when the scale is in its inoperative position as described.

4. A weighing scale and mounting therefor comprising in combination, weighing mechanism of the character intended to lie flat upon a horizontal supporting surface during use and having its operating parts enclosed within a rigid casing, a bracket intended to be fixed upon a vertical surface at a point spaced slightly above said horizontal surface, a plate member of a length greater than the length of said casing pivotally mounted at one end upon said bracket whereby said plate may be swung upwardly against said vertical surface, and means pivotally connecting the outer end of said plate member to one end of said scale casing whereby when said plate is swung downwardly the scale may rest upon said horizontal surface in operative position, and when swung upwardly the scale may be suspended vertically parallel with said vertical surface in inoperative position, said plate having side flanges adapted to overlap the side walls of said scale casing when the scale is in its operative position, the end portions of said side flanges providing a part of the pivotal connecting means between said plate, and said bracket and said scale casing and said bracket.

WILLIAM H. GREENLEAF.